United States Patent [19]

Gorski

[11] Patent Number: 4,823,464

[45] Date of Patent: Apr. 25, 1989

[54] GRASS TRIMMER

[75] Inventor: John W. Gorski, Rock Hill, S.C.

[73] Assignee: Textron Inc., Providence, R.I.

[21] Appl. No.: 95,634

[22] Filed: Sep. 14, 1987

[51] Int. Cl.4 .................................................. B26B 7/00
[52] U.S. Cl. ........................................... 30/276; 30/347
[58] Field of Search ................... 30/276, 347, 388–391

[56] References Cited

U.S. PATENT DOCUMENTS

| | | | |
|---|---|---|---|
| 2,730,803 | 1/1956 | Kimball | 30/390 |
| 3,123,111 | 3/1964 | Mattson | 30/390 |
| 4,118,865 | 10/1978 | Jacyno et al. | 30/276 |
| 4,584,771 | 4/1986 | Tillotson | 30/276 |

Primary Examiner—Douglas D. Watts
Attorney, Agent, or Firm—Abraham Ogman

[57] ABSTRACT

A shield for a string trimmer using a rotating flexible cutting element defining a circular perimeter including: a base wall generally parallel to the plane of the rotating cutting element and having a rear portion; and an arcuate rim member extending downwardly from a portion of the base wall, the rim member and the perimeter defining a pair of oppositely directed volute pathways each terminating in an opening, each of said pathways having a minimum width adjacent to the rear portion of the base wall which gradually increases in width from the rear portion to the opening.

14 Claims, 3 Drawing Sheets

GRASS TRIMMER

FIELD OF THE INVENTION

This invention relates to grass trimmers of the type employing a flexible cord as a grass or vegetation cutting element and more particularly to a new and improved shield for such string trimmers to improve protection for the operator from cuttings and other material propelled by the rotary motion of the cutting element.

BACKGROUND OF THE INVENTION

Devices are known in the prior art for grass and weed cutting, including devices for edging and trimming lawns, which employ shields, guards or housings to partially enclose the cutting and trimming elements. Examples of such devices are shown in U.S. Pat. Nos. 2,708,335; 3,006,421; 3,608,291; 4,200,978; and 4,584,771.

In U.S. Pat. Nos. 2,708,335 and 3,006,421 there are disclosed lawn edgers and trimmers which employ vertical guards with flanges extending outwardly mainly around the upper portion of the guard and extending for various distances about the guard. The primary purpose of these guards being to discharge the grass and soil removed by the edgers in a lateral direction onto the lawn and away from the sidewalk for example.

In U.S. Pat. No. 3,608,291 there is disclosed a chuteless housing for rotary mowers for mulching grass clippings and depositing the clippings below the housing.

In U.S. Pat. No. 4,200,978 there is disclosed a shield for grass trimmers employing a flexible cutting element. As disclosed the shield is adapted for attachment to the lower portion of the trimmer housing between the cutting element and the ground to prevent the cutting element from being slowed or stopped as a result of contacting the ground.

U.S. Pat. No. 4,584,771 is primarily concerned with a device for metering the length of a flexible filament cutting element for use in flexible filament vegetation cutting devices. In describing the metering device it is disclosed that a shield may be employed to partially enclose the cutting path defined by the rotation of the flexible cutting filament.

For the most part, the various housings, guards and shields illustrated in the aforementioned patents are not designed to provide substantial control of the cutting debris and improved protection of the operator.

While the prior art provides improvement in the areas intended, there is still a great need for a grass trimmer of the type employing a flexible cutting element which provides substantial control of the direction of discharge of the cuttings and other debris propelled by the cutting element away from the operator to thereby provide enhanced or improved safety of operation.

Accordingly a principal desired object of the present invention is to provide a grass trimmer of the type employing a flexible cutting element providing improved safety of operation.

Another desirable object of the present invention is to provide a grass trimmer having an improved shield that will propel grass or other debris away from the operator.

A still further desirable object of the present invention is to provide a grass trimmer having an improved shield which is light in weight to maximize maneuverability.

Another desirable object of the present invention is to provide a grass trimmer having a deflector which serves to protect the flexible cutting element, remove exess cutting element, and assist prevention of accidental cutting of vegetation to be preserved.

A still further desirable object of the present invention is to provide a grass trimmer of the above desirable objects of simple and inexpensive but sturdy construction and efficient in operation.

These and other desirable objects of the invention will in part appear hereinafter and will in part become apparent after consideration of the specification with reference to the accompanying drawings.

SUMMARY OF THE INVENTION

The present invention discloses a grass trimmer of the type employing a flexible cord as the cutting element and a new and improved deflector shield which is attached to the trimmer housing and about the rotating hub to which the flexible cutting element is attached and extends radially outwardly therefrom. As briefly stated, the shield comprises a base wall generally parallel to the cutting plane of the flexible cutting element and has an aperture therein throughwhich the hub member extends. The base wall has a generally forward portion held away from the operator and a generally rearward portion held toward the operator. An arcuate rim member is disposed about the rear portion of the base wall and extends downwardly beyond the circular cutting plane of the flexible cutting element and circumferentially about a portion of the perimeter defined by the circular cutting plane. The arcuate member is constructed so as to be spaced from the perimeter of the cutting plane and defines a pathway therebetween having a minimum width area adjacent the most rearward portion of the base wall and which gradually increases in path width therefrom circumferentially laterally about each side of the perimeter and terminates in end members adjacent the forward portion of the base wall to form a pair of openings between the perimeter and the end members. Each end member is at a relative maximum distance from the cutting perimeter compared to the rear most position of the rim member whereby rotation of the flexible element cooperates with the openings and the pathway to direct cut vegetation into one opening and discharge it from the other opening toward the front portion of said base wall and away from the operator. The pathway defined by the rim member and the perimeter of the cutting plane preferably extends at least about 180° circumferentially about the rear portion of the perimeter of the cutting plane whereby one half of the passageway is a mirror image of the other half and forms a pair of oppositely directed volute pathways. In this manner either side of the passageway serves as receiving scoop or a discharge chute for cuttings and debris depending upon the direction of rotation of the flexible cutting element. The deflector shield is optionally suitable for use with various power sources such as an electric or gasoline motor power source for rotatably driving the flexible cutting element regardless of the direction of rotation of the cutting element. In a preferred embodiment, the front portion of the base wall is provided with a guard member which serves as a cut-off blade as well as a guide and cutting element protector.

BRIEF DESCRIPTION OF THE DRAWINGS

For a fuller understanding of the nature and desired objects of the invention, reference should be had to the following detailed description taken in connection with the accompanying drawings wherein like reference characters denote corresponding parts throughout the several views and wherein.

DETAILED DESCRIPTION OF THE PREFERRED EMBODIMENT(S)

Figure 1:
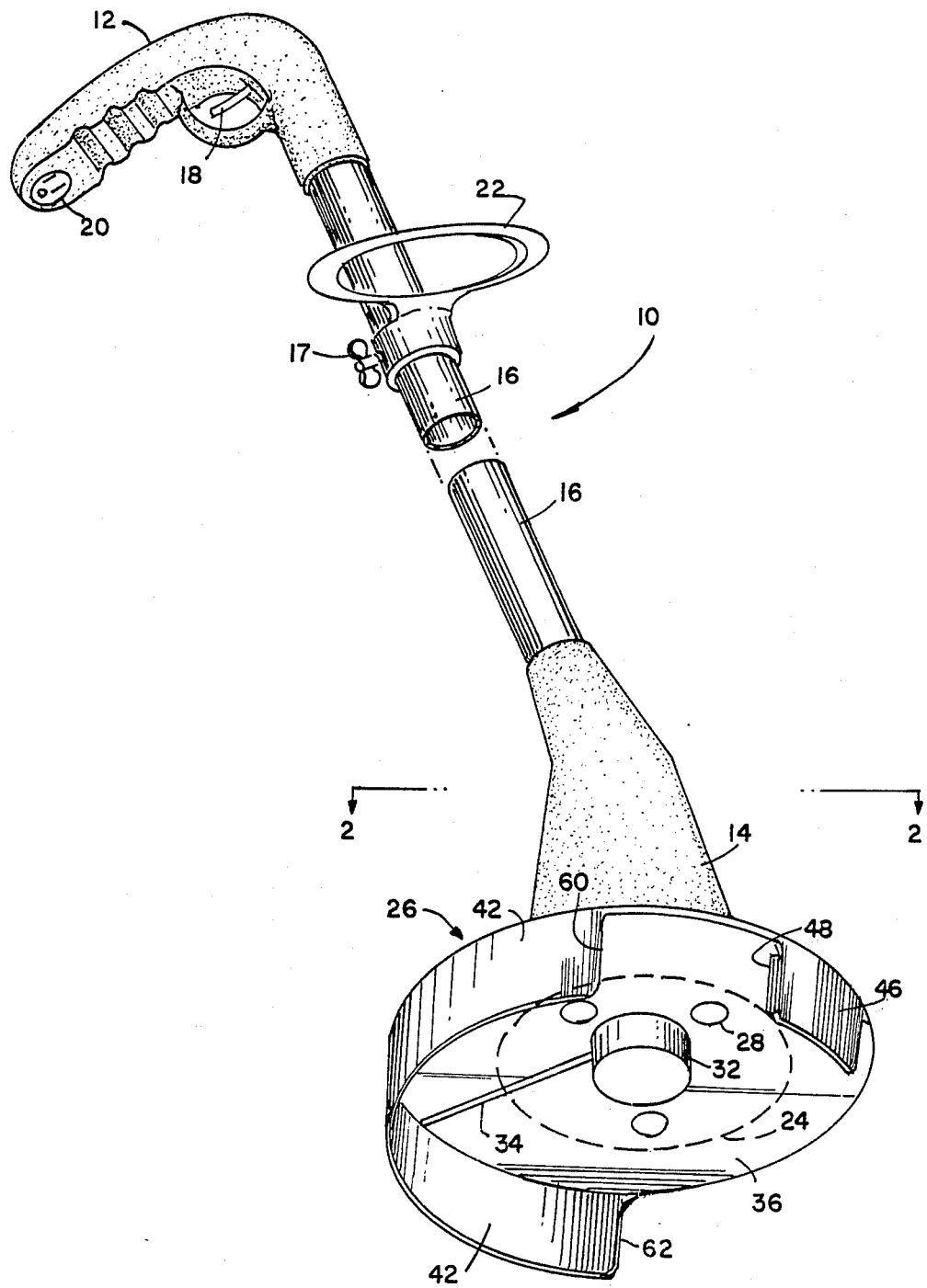
FIG. 1 is a perspective view of a grass trimmer device employing a flexible cutting element and a protective shield mounted on the lower end of the motor housing in accordance with the present invention and showing the cutting element in the most rearward position.

Referring now to the drawings, a grass trimmer designated generally by the numberal 10 is shown in FIG. 1. The grass trimmer 10 sometimes referred to herein as a string trimmer includes a handle assembly 12 joined to a motor housing 14 by means of a metal shaft 16. The grass trimmer 10 illustrated in FIG. 1 is of the cordless type (for simplicity of description) employing rechargeable batteries (not shown) as a power source mounted within the handle housing 12. The handle housing 12 includes a trigger switch 18 which when depressed energizes an electric motor (not shown) mounted in the motor housing 14. The motor is connected to the switch and battery via insulated electrical conductors (not shown) passing through the shaft 16. A male connector 20 provided in the handle assembly 12 permits recharging of the battery mounted therein with a suitable recharging unit of a conventional type (not shown). The grass trimmer is provided with a secondary operator's handle 22 which is adjustably mounted on shaft 16 via a suitable wingnut and clamp 17.

Figure 3:
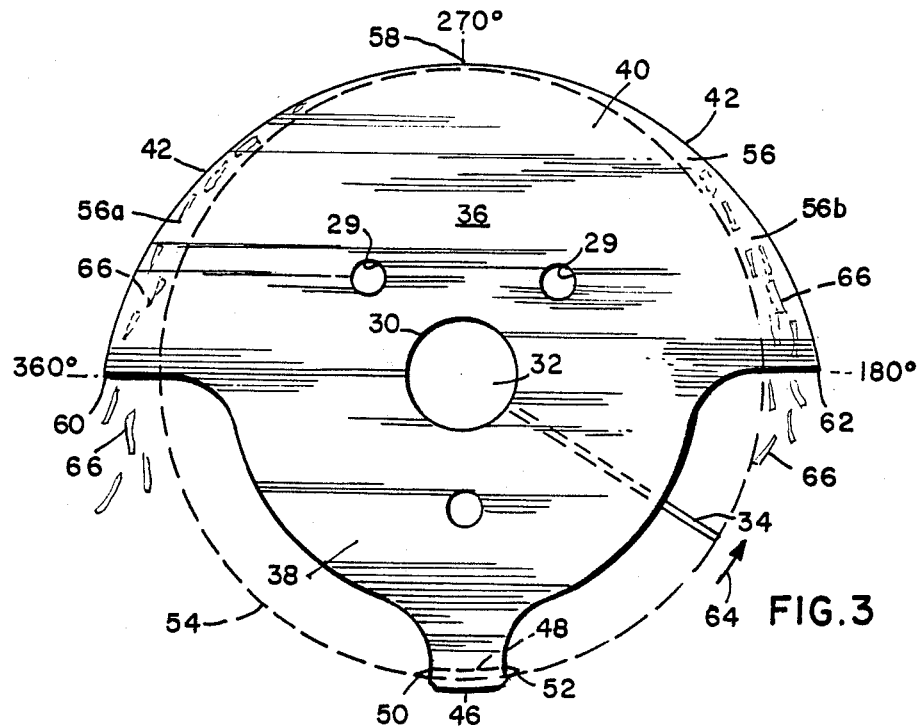
FIG. 3 is a top elevation view of the protective shield of FIG. 1 and further illustrating the perimeter of the circular cutting plane of the cutting element.
Figure 2:
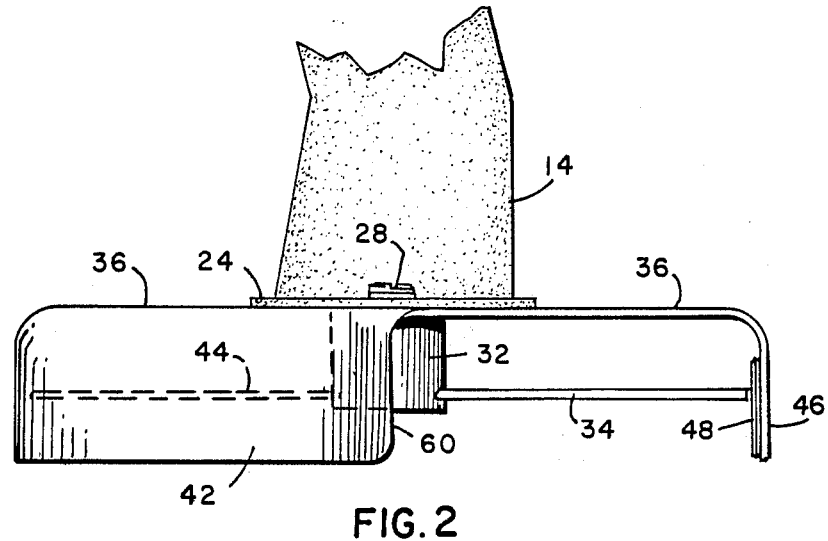
FIG. 2 is a fragmentary view partly in right side elevation and partly in vertical section taken along the line 2—2 of FIG. 1 and showing the cutting element in the most forward position.

The motor housing 14 of the grass trimmer is preferably of a moulded plastic construction in which the electric motor employed to drive the cutting cord rotatably is mounted. The lower end portion of the motor housing includes an annular flanged portion 24 (as best seen in FIG. 2 and shown by the dotted line in FIG. 1) to which the protective shield member shown generally by the numeral 26 is attached by suitable fastener means such as bolts 28 through apertures 29 (FIG. 3). The protective shield 26 which, for example, can be formed of plastic or sheet metal has an aperture 30 (as best seen in FIG. 3) near the center thereof through which a hub member 32 extends. The hub member 12 is mounted on the motor drive shaft (not shown) and is rotated at a high speed thereby. Associated with the hub member 32 is a flexible cutting element 34 formed of nylon, plastic or the like material. In the preferred embodiment the hub member 32 is a cutting filament metering device for the flexible cutting element in which a flexible filament cutting element is coiled on a filament holder rotatably driven about a substantially vertical axis with the free end of the cutting element defining a cutting plane. One such suitable hub metering device is described in U.S. Pat. No. 4,584,771 and accordingly no further details of the metering wil be provided herein.

The shield member 26 has a base wall portion 36 which extends generally horizontally during use of the trimmer device 10. The axis of rotation of the hub member 32 to which the cutting element 34 is attached and metered therefrom is generally perpendicular to the base wall portion 36 of shield member 26.

The base wall 36 has a generally front or forward portion 38 which is positioned away from the operator and a back or rearward portion 40 positioned toward the operator when the trimmer is in use. Disposed about the rear portion of the base wall 36 is a rim member 42 which is arcuate or curved and extends downwardly from the rear portion of the base wall 36 a distance greater than the length of hub member 32 and the circular cutting plane formed by the rotating cutting element and shown by the dotted line 44 of FIG. 2. In a preferred embodiment the forward portion 38 of the base wall 36 is provided with a guard member 46 which extends downwardly preferably the same distance as rim member 42. Attached to the inner surface of guard member 46 is a double edged cutting blade 48 having lateral cutting edges 50and 52 which sever the cutting element and remove excess of the cutting element as the element rotates in its circular cutting path in either direction of rotation as determined by the trimmer motor. The guard member 46 also serves to protect the hub member and cutting element from contact with undesirable objects such as rocks and as a guide to preserve plants or other vegetation not to be cut.

Referring now more particularly to FIG. 3 the relationship between the arcuate rim member 42 and the perimeter 54 (dotted line) defined by the circular cutting plane of cutting element 34 can be best understood. As illustrated, the arcuate rim member 42 is constructed and positioned so that it is spaced from the perimeter 54 so as to define a pathway 56 therebetween having a minimum width area 58 adjacent the most rearward portion of the base wall 36 and gradually increasing in width therefrom circumferentially and laterally about each side of the perimeter 54 and terminating in end members 60 and 62 adjacent the forward portion 38 of the base wall 36. The end members 60 and 62 are at a maximum distance from the perimeter 54 relative to the minimum pathway area 58. In this manner each half 56a and 56b of the pathway 56 are mirror images and define a pair of oppositely directed volute pathways.

Under normal operating conditions, still referring in particular to FIG. 3, rotation of the flexible cutting element 34 in the direction of the arrow 64 propels the cuttings 66 into pathway 56b which then functions as an intake scoop for the cuttings. The cuttings are driven about the pathway 56 to the other side 56a which functions as a discharge chute in a controlled direction away from the operator. The rotating motion of the cutting element and the generated air flow serve in combination with the pathway to propel the cuttings and other debris about the pathway from intake to discharge. It will be understood, that, as an alternative the cutting element can be rotated in the opposite direction to provide the same intake and discharge functions in a reverse manner. In this mode pathway 56a functions as the intake scoop while 56b functions as a discharge chute. It was discovered that a pathway formed in accordance with the present invention provides for the intake and controlled discharge of cuttings and other debris in a forward direction, for example, away from the operator, in contrast with prior art devices which discharge generally downwardly and/or laterally and provide little or no directional control for the cuttings and other debris. In a preferred embodiment, the pathway 56 extends circumferentially about the perimeter 54 for 180° or from 180° to 360° as shown in FIG. 3 with the center of the pathway or narrowest pathway area 58 being at 270°. The degrees selected are for descriptive purposes only to illustrate the relative positions.

Figure 4:
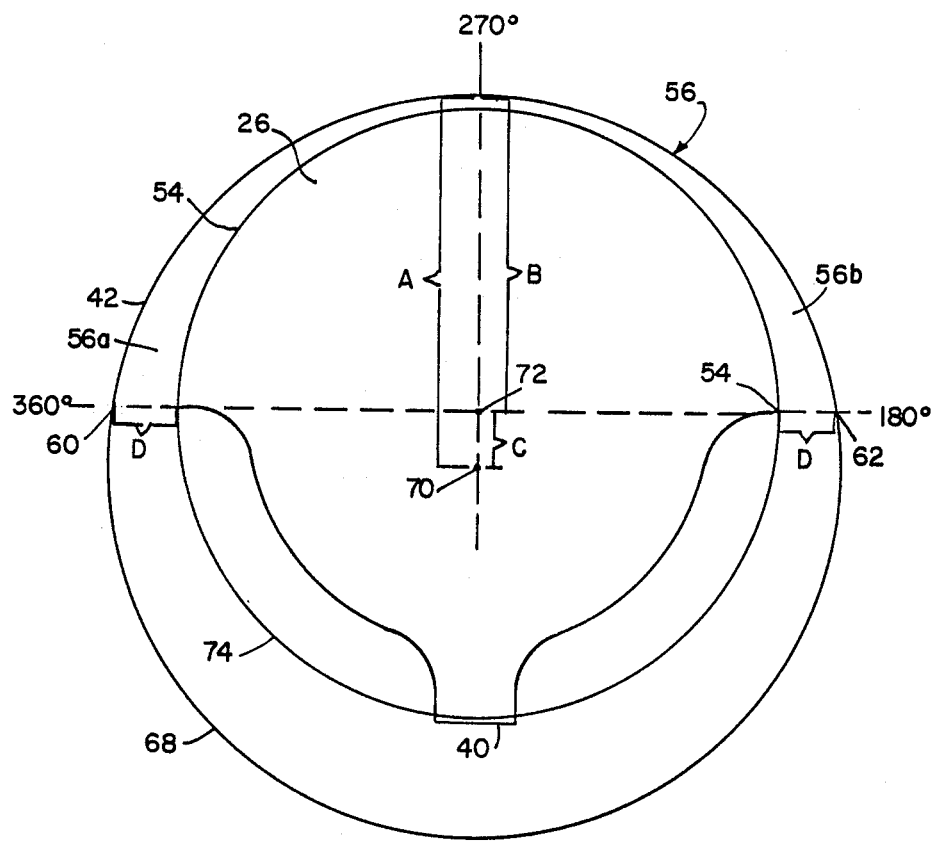
FIG. 4 is a schematic representation of the relationship of the perimeter of the cutting plane to the arcuate rim member in forming the pathway therebetween.

It has been discovered that in construction of a grass trimmer in accordance with the present invention a suitable pathway 56 can be formed between the perimeter of the cutting plane 54 and the rim member 42 when the relationship described and illustrated in FIG. 4 is provided. As illustrated in FIG. 4 circle 68, having a center 70, represents the circle described by the arcuate rim member 46 of shield member 26. Similarly circle 74, having a center 72, represents the perimeter 54 described by the plane of the cutting element 34. Accordingly when the radius of circle 68 is length "A" and the radius of circle 72 is length "B", the difference in lengths between radius A and B i.e. A−B is the length "C". Also the distance between the end member 62 and the adjacent perimeter 54, which may otherwise be called the opening to pathway 56b also has a length "D" which is equal to "C". Thus a suitable pathway 56 is obtained when the center of circle 74 is displaced rearwardly from the center of circle 68 so that the distance "C" (the difference in radii length A and B) is equal to the distance "D". Thus when the relationship of A−B=C=D is provided a suitable pathway is obtained.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in limiting sense.

What is claimed is:

1. A shield for a string trimmer using a rotating flexible cutting element defining a circular perimeter comprising:
    a base wall generally parallel to the plane of the rotating cutting element and having a rear portion; and
    an arcuate rim member extending downwardly from a portion of the base wall, said rim member and said perimeter defining a pair of oppositely directed volute pathways each terminating in an opening, each of said pathways having a minimum width adjacent to the rear portion of the base wall which gradually increases in width from the rear portion to the opening.

2. The shield of claim 1 further comprising a guard member extending downwardly from a portion of the base wall adjacent said perimeter.

3. The shield of claim 2 further comprising a cutting blade disposed upon said guard member adjacent said perimeter whereby excess cutting element is removed thereby.

4. An apparatus for cutting vegetation and the like comprising: a housing; a motor means associated with said housing; a hub member coupled to said motor and driven rotatably thereby; a flexible cutting element attached to said hub member and extending radially outwardly therefrom and rotatable therewith to form a circular cutting plane generally perpendicular to the axis of rotation of said hub member; and a shield member attached to said housing; said shield member comprising:
    a base wall generally parallel to said cutting plane and having an aperture therein throughwhich said hub member extends;
    said base wall having a generally forward portion held away from the operator and a generally rearward portion held toward the operator;
    an arcuate rim member disposed about the rear portion of said base wall;
    said arcuate rim member extending downward beyond the circular cutting plane of said flexible element and circumferentially about a portion of the perimeter defined by said circular cutting plane;
    said arcuate member and said perimeter defining a pair of oppositely directed gradually widening volute pathways each terminating in an opening whereby rotation of said flexible element cooperates with said openings and said pathways to direct cut vegetation into one opening and discharge it from the other opening toward the front portion of said base wall and away from the operator.

5. An apparatus for cutting vegetation and the like comprising: a housing; a motor means mounted in said housing; a hub member coupled to said motor and driven rotatably thereby; a flexible cutting element attached to said hub member and extending radially outwardly therefrom and rotatable therewith to form a circular cutting plane generally perpendicular to the axis of rotation of said hub member; a shield member attached to said housing; said shield member comprising:
    a base wall generally parallel to said cutting plane and having an aperature therein throughwhich said hub member extends;
    said base wall having a generally forward portion held away from the operator and a generally rearward portion held toward the operator;
    an arcuate rim member disposed about the rear portion of said base wall;
    said arcuate rim member extending downwardly beyond the circular cutting plane of said flexible element and circumferentially about a portion of the perimeter defined by said circular cutting plane;
    said arcuate member being spaced from said perimeter and defining a pathway therebetween having a minimum width area adjacent the most rearward portion of said base wall and gradually increasing in width therefrom circumferentially laterally about each side of said perimeter and terminating in end members adjacent the forward portion of said base wall to form a pair of openings with each said end member being at a relative maximum distance from said perimeter whereby rotation of said flexible element cooperates with said openings and said pathway to direct cut vegetation into one opening and discharge it from the other opening toward the front portion of said base wall and away from the operator; and a guard member disposed upon the front portion of said base wall and depending therefrom adjacent the perimeter of said cutting element.

6. The apparatus in accordance with claim 5 further comprising a cutting blade disposed upon said guard member adjacent the perimeter of said cutting plane whereby excess cutting element is removed thereby.

7. The apparatus in accordance with claim 5 wherein said hub member includes a cutting element metering device.

8. The apparatus in accordance with claim 5 wherein said shield member is formed of plastic material.

9. The apparatus in accordance with claim 5 wherein said shield member is formed of sheet metal.

10. An apparatus for cutting vegetation and the like comprising: a housing; a motor means mounted in said housing; a hub member coupled to said motor and driven rotatably thereby; a flexible cutting element attached to said hub member and extending radially outwardly therefrom and rotatable therewith to form a circular cutting plane generally perpendicular to the axis of rotation of said hub member; a shield member attached to said housing; said shield member comprising:
- a base wall generally parallel to said cutting plane and having an aperture therein throughwhich said hub member extends;
- said base wall having a generally forward portion held away from the operator and a generally rearward portion held toward the operator;
- an arcuate rim member disposed about the rear portion of said base wall;
- said arcuate rim member extending downwardly beyond the circular cutting plane of said flexible element and circumferentially about a portion of the perimeter defined by said circular cutting plane;
- said arcuate member being spaced from said perimeter and defining a pathway therebetween having a minimum width area adjacent the most rearward portion of said base wall and gradually increasing in width therefrom circumferentially laterally about each side of said perimeter and terminating in end members adjacent the forward portion of said base wall to form a pair of openings with each said end member being at a relative maximum distance from said perimeter whereby rotation of said flexible element cooperates with said openings and said pathway to direct cut vegetation into one opening and discharges it from the other opening toward the front portion of said base wall and away from the operator;
- a guard member disposed upon the front portion of said base wall and depending therefrom adjacent the perimeter of said cutting element; and
- a cutting blade disposed upon said guard member adjacent the perimeter of said cutting plane whereby excess cutting element is removed thereby.

11. The apparatus in accordance with claim 10 wherein said arcuate rim member defines a circle having a radius of length A and said circular cutting plane has a radius of length B whereby A minus B equals length C; and said distance between each said end member and the adjacent perimeter of said circular cutting plane has a length D whereby the relationship of said lengths A,B,C, and D is A minus B equals C equals D to thereby form a suitable pathway between said perimeter and said arcuate rim member.

12. In a string trimmer apparatus for cutting vegetation and the like including: a housing; a motor means; a hub member coupled to said motor and driven rotatably thereby; a flexible cutting element attached to said hub member and extending radially outwardly therefrom and rotatable therewith to form a curcular cutting plane generally perpendicular to the axis of rotation of said hub member; the improvement characterized by a shield member attached to said housing; said shield member comprising:
- a base wall generally parallel to said cutting plane and having an aperture therein throughwhich said hub member extends;
- said base wall having a generally forward portion held away from the operator and a generally rearward porton held toward the operator;
- an arcuate rim member disposed about the rear portion of said base wall;
- said arcute rim member extending downwardly beyond the circular cutting plane of said flexible element and circumferentially about a portion of the perimeter defined by said circular cutting plane;
- said arcuate member being spaced from said perimeter and defining a pathway therebetween having a minimum width area adjacent the most rearward portion of said base wall and gradually increasing in width therefrom circumferentially laterally about each side of said perimeter and terminating in end members adjacent the forward portion of said base wall to form a pair of openings with each said end member being at a relative maximum distance from said perimeter whereby rotation of said flexible element cooperates with said openings and said pathway to direct cut vegetation into one opening and discharge it from the other opening toward the front portion of said base wall and away from the operator.

13. A shield for a grass trimmer comprising:
- a shield member defined by a base member and a circular rim member, said circular rim member having a radius "A" from a first center; and
- a flexible rotating cutting element defining a circular perimeter having a radius "B" smaller than radius "A" and a center of rotation, said center of rotation being displaced rearward from the first center toward the rim member thereby defining oppositely directed volute pathways between the circular rim and the circular perimeter.

14. A trimmer as defined in claim 13 where the cutting element is a rotating string.

* * * * *